United States Patent
Dickenson et al.

(10) Patent No.: US 10,623,432 B2
(45) Date of Patent: Apr. 14, 2020

(54) MITIGATING SECURITY RISKS UTILIZING CONTINUOUS DEVICE IMAGE RELOAD WITH DATA INTEGRITY

(71) Applicant: INTERNATIONAL BUSINESS MACHINES CORPORATION, Armonk, NY (US)

(72) Inventors: Marc A. Dickenson, Austin, TX (US); Timothy J. Hahn, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 15/629,589

(22) Filed: Jun. 21, 2017

(65) Prior Publication Data
US 2018/0375889 A1    Dec. 27, 2018

(51) Int. Cl.
| H04L 29/06 | (2006.01) |
| H04L 29/08 | (2006.01) |
| H04W 4/70 | (2018.01) |
| H04W 12/00 | (2009.01) |

(52) U.S. Cl.
CPC .......... *H04L 63/1433* (2013.01); *H04L 63/14* (2013.01); *H04L 63/1408* (2013.01); *H04L 63/1441* (2013.01); *H04L 67/12* (2013.01); *H04L 67/34* (2013.01); *H04W 4/70* (2018.02); *H04W 12/0023* (2019.01)

(58) Field of Classification Search
CPC . H04L 63/1408; H04L 63/1433; H04L 63/14; H04L 67/12
See application file for complete search history.

(56) References Cited

U.S. PATENT DOCUMENTS

| 5,022,077 A | 6/1991 | Bealkowski et al. |
| 6,327,660 B1 | 12/2001 | Patel |
| 6,931,558 B1 * | 8/2005 | Jeffe ................... G06F 11/1464 713/340 |
| 7,392,327 B2 | 6/2008 | Kojima et al. |
| 8,271,443 B1 * | 9/2012 | Swift .................. G06F 11/1464 707/640 |
| 8,904,525 B1 * | 12/2014 | Hodgman ............. G06F 21/562 726/22 |
| 9,335,904 B2 | 5/2016 | Junqua et al. |
| 9,940,460 B1 * | 4/2018 | Derbeko ............... G06F 21/568 |

(Continued)

OTHER PUBLICATIONS

Degaonkar et al. "Management of Internet of Things Devices." U.S. Appl. No. 62/479,755. Mar. 31, 2017. (Year: 2017).*

(Continued)

*Primary Examiner* — Karl L Schmidt
(74) *Attorney, Agent, or Firm* — Konrad Raynes Davda & Victor LLP; Janaki K. Davda

(57) ABSTRACT

Provided are techniques for mitigating security risks utilizing continuous device image reload with data integrity. Continuous reload of a first image on a device in an Internet of Things (IoT) group of devices coupled to an IoT service is performed based on triggers. A trigger from the triggers is received that indicates one of that a period of time has expired, that notification of a known infection has been received, and that there has been failure of an internal onboard security check. A second image is obtained that is not infected from the IoT service. The device is reloaded with the second image to replace the first image with the second image.

18 Claims, 11 Drawing Sheets

(56) References Cited

U.S. PATENT DOCUMENTS

| | | | | |
|---|---|---|---|---|
| 10,223,098 | B2* | 3/2019 | Lancioni | H04W 4/70 |
| 2005/0064859 | A1* | 3/2005 | Kotzin | H04M 3/42 |
| | | | | 455/419 |
| 2006/0047946 | A1* | 3/2006 | Keith, Jr. | G06F 9/4416 |
| | | | | 713/2 |
| 2006/0085686 | A1* | 4/2006 | Cheston | G06F 11/1438 |
| | | | | 714/38.13 |
| 2007/0294566 | A1* | 12/2007 | Solyanik | G06F 9/4416 |
| | | | | 714/6.11 |
| 2009/0254897 | A1* | 10/2009 | Segalov | H04M 1/0254 |
| | | | | 717/173 |
| 2012/0198222 | A1* | 8/2012 | Tukol | G06F 9/44505 |
| | | | | 713/2 |
| 2013/0066839 | A1* | 3/2013 | Westwood | G06F 11/1464 |
| | | | | 707/679 |
| 2013/0212709 | A1* | 8/2013 | Tucker | G06F 21/55 |
| | | | | 726/29 |
| 2013/0298244 | A1* | 11/2013 | Kumar | G06F 21/52 |
| | | | | 726/25 |
| 2013/0332923 | A1* | 12/2013 | Shaposhnik | G06F 21/57 |
| | | | | 718/1 |
| 2013/0332924 | A1* | 12/2013 | Shaposhnik | G06F 21/57 |
| | | | | 718/1 |
| 2014/0095625 | A1* | 4/2014 | Quan | H04L 67/1095 |
| | | | | 709/205 |
| 2014/0150106 | A1* | 5/2014 | Butler | G06F 21/51 |
| | | | | 726/24 |
| 2014/0208426 | A1* | 7/2014 | Natarajan | H04L 63/1416 |
| | | | | 726/23 |
| 2015/0163121 | A1* | 6/2015 | Mahaffey | G06F 11/0766 |
| | | | | 707/687 |
| 2017/0041477 | A1* | 2/2017 | Hirose | H04N 1/00244 |
| 2017/0169234 | A1* | 6/2017 | Camiel | H04W 4/70 |
| 2017/0264629 | A1* | 9/2017 | Wei | H04L 63/1433 |
| 2017/0315820 | A1* | 11/2017 | Entezari | H04L 67/12 |
| 2017/0372059 | A1* | 12/2017 | Sindia | G06F 21/32 |
| 2018/0081666 | A1* | 3/2018 | Surdu | G06F 8/65 |
| 2018/0129805 | A1* | 5/2018 | Samuel | G06F 21/55 |
| 2018/0165157 | A1* | 6/2018 | Olinsky | G06F 11/1433 |
| 2018/0183685 | A1* | 6/2018 | Cook | H04L 67/12 |
| 2018/0241781 | A1* | 8/2018 | Vasters | H04W 12/12 |
| 2018/0278647 | A1* | 9/2018 | Gabaev | H04L 63/1466 |
| 2018/0285234 | A1* | 10/2018 | Degaonkar | G06F 11/3476 |
| 2018/0367560 | A1* | 12/2018 | Mahaffey | H04L 63/1425 |
| 2019/0020669 | A1* | 1/2019 | Glatfelter | G06N 20/00 |
| 2019/0317465 | A1* | 10/2019 | Wei | G06F 9/45558 |

OTHER PUBLICATIONS

A. B. Dorothy, S. B. R. Kumar and J. J. Sharmila, "IoT Based Home Security through Digital Image Processing Algorithms," 2017 World Congress on Computing and Communication Technologies (WCCCT), Tiruchirappalli, 2017, pp. 20-23. (Year: 2017).*

D. Jayarathna, V. Varadharajan and U. Tupakula, "Integrated Security for Services Hosted in Virtual Environments," 2016 IEEE Trustcom/BigDataSE/ISPA, Tianjin, 2016, pp. 82-89. (Year: 2016).*

Sáanchez López, Tomás, et al. "Adding sense to the Internet of Things." Personal and Ubiquitous Computing 16.3 (2012): 291-308. (Year: 2012).*

Alberca, C., S. Pastrana, G. Suarez-Tangil, and P. Palmieri, "Security Analysis and Exploitation of Arduino devices in the Internet of Things", Proceedings of the ACM International Conference on Computing Frontiers, © 2016 ACM, Total 6 pp.

De, A., M.N.I. Khan, and S. Ghosh, "Attack Resilient Architecture to Replace Embedded Flash with STTRAM in Homogeneous IoTs", arXiv preprint arXiv:1606.00467 (2016), Total 7 pp.

Fremantle, P. and P. Scott, "A Security Survey of Middleware for the Internet of Things", PeerJ PrePrints 3 (2015): e1521, Total 23 pp.

IBM, "Connect Raspberry Pi as Managed Device to IBM Watson IoT Platform", [online], [Retrieved on May 10, 2017]. Retrieved from the Internet at <URL: https://developer.ibm.com/recipes/tutorials/connect-raspberry-pi-as-managed-device-to-ibm-iot-foundation/>, created on Sep. 7, 2015, modified on Dec. 8, 2016, Total 31 pp.

IBM, "Getting Started with Watson IoT Platform", last updated: May 3, 2017, [online], [Retrieved on May 10, 2017]. Retrieved from the Internet at <URL: https://console.ng.bluemix.net/docs/services/IoT/index.html#gettingstartedtemplate> (redirected from <URL: https://docs.internetothings.ibmcloud.com/devices/device_mgmt/index.html>), Total 4 pp.

IBM, "IBM Watson IoT Platform", [online], [Retrieved on May 10, 2017]. Retrieved from the Internet at <URL: https://internetofthings.ibmcloud.com/#/>, Total 6 pp.

IBM, "IBM Watson IoT Platform HTTP REST API", [online], [Retrieved on May 10, 2017]. Retrieved from the Internet at <URL: https://docs.internetofthings.ibmcloud.com/swagger/v0002.html>, Total 116 pp.

IBM Corporation, "Watson IoT Platform: Recognized as a leader in Internet of Things Platforms", [online], [Retrieved on May 30, 2017], Retrieved from the Internet at <URL: https://www.ibm.com/internet-of-things/platform/watson-iot-platform/>, 8 pp.

Jung, S.W. and S. Jung, "Secure Bootstrapping and Rebootstrapping for Resource-Constrained Thing in Internet of Things", Hindawi Publishing Corporation, International Journal of Distributed Sensor Networks, vol. 2015, Article ID 174383. Retrieved from the Internet at <URL: http://dx.doi.org/10.1155/2015/174383>, Copyright © 2015, Total 10 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Sep. 2011, Computer Security Division Information Technology Laboratory National Institute of Standards and Technology, Total 7 pp.

Roman, R., J. Zhou, and J. Lopez, "On the Features and Challenges of Security and Privacy in Distributed Internet of Things", © 2013 Elsevier B.V., Computer Networks 57.10 (2013), Total 14 pp.

Wurm, J., K. Hoang, O. Arias, A. Sadeghi, and Y. Jin, "Security Analysis on Consumer and Industrial IoT Devices", 2016 21st Asia and South Pacific Design Automation Conference (ASP-DAC). IEEE, 2016, Total 6 pp.

* cited by examiner

MITIGATING SECURITY RISKS UTILIZING CONTINUOUS DEVICE IMAGE RELOAD WITH DATA INTEGRITY

BACKGROUND

Embodiments of the invention relate to mitigating security risks utilizing continuous device image reload with data integrity. This may be used for Internet of Things (IoT) devices.

The Internet of Things (IoT) may be described as a group of devices that are connected to the Internet and communicate with each other and/or the rest of the internet. Each of the IoT devices typically has electronics and software to enable them to collect information and communicate that information with other IoT devices. For example, an IoT device may have a sensor to receive, as well as, track information.

There may be security threats to IoT devices. In the IoT domain, the security for IoT devices is a growing concern.

SUMMARY

Provided is a method for mitigating security risks utilizing continuous device image reload with data integrity. The method comprises: performing, using a processor of a computer, continuous reload of a first image on a device in an Internet of Things (IoT) group of devices coupled to an IoT service based on triggers by: receiving a trigger from the triggers that indicates one of that a period of time has expired, that notification of a known infection has been received, and that there has been failure of an internal onboard security check; obtaining a second image that is not infected from the IoT service; and reloading the device with the second image to replace the first image with the second image.

Provided is a computer program product for mitigating security risks utilizing continuous device image reload with data integrity. The computer program product comprises a computer readable storage medium having program code embodied therewith, the program code executable by at least one processor to perform operations of: performing continuous reload of a first image on a device in an Internet of Things (IoT) group of devices coupled to an IoT service based on triggers by: receiving a trigger from the triggers that indicates one of that a period of time has expired, that notification of a known infection has been received, and that there has been failure of an internal onboard security check; obtaining a second image that is not infected from the IoT service; and reloading the device with the second image to replace the first image with the second image.

Provided is a computer system for mitigating security risks utilizing continuous device image reload with data integrity. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: performing continuous reload of a first image on a device in an Internet of Things (IoT) group of devices coupled to an IoT service based on triggers by: receiving a trigger from the triggers that indicates one of that a period of time has expired, that notification of a known infection has been received, and that there has been failure of an internal onboard security check; obtaining a second image that is not infected from the IoT service; and reloading the device with the second image to replace the first image with the second image.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
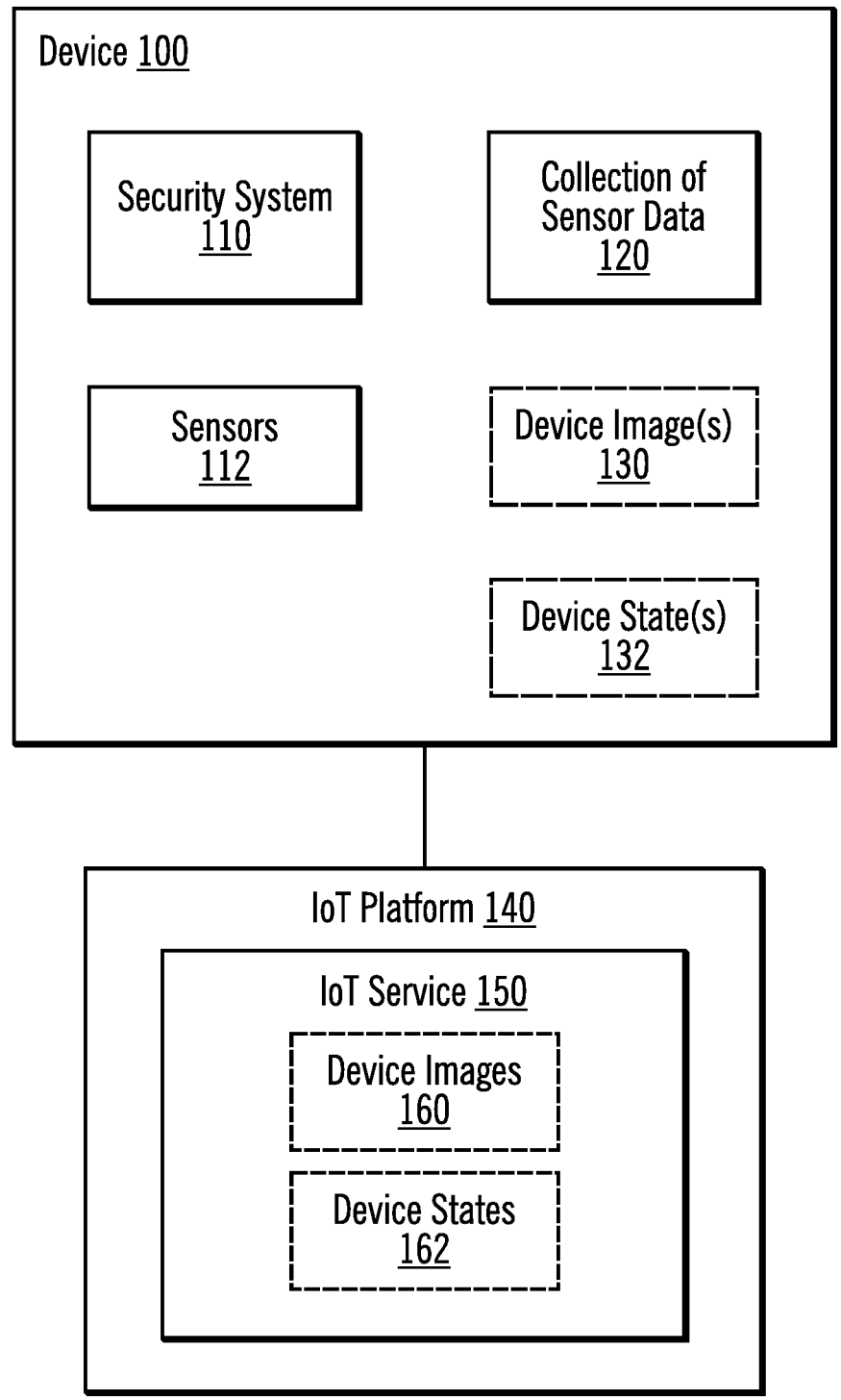
FIG. 1 illustrates, in a block diagram, a computing environment in accordance with certain embodiments.

FIG. 1 illustrates, in a block diagram, a computing environment in accordance with certain embodiments. A device 100 includes a security system 110, sensors, a collection of sensor data 120, one or more device images 130, and one or more device states 132. With embodiments, the device 100 includes sensors 112 to receive and track information. The security system 110 receives information from the sensors 112. The collection of sensor data 120 may be from the sensors 112 and/or from sensors of other devices. With embodiments, the security system 110 may reside at a device within an Internet of Things, may be a server connected to the Internet of Things or may be a computing device in a cloud environment.

With embodiments, the one or more device images 130 each include an image for the firmware of the device 100 and/or an image for the Operating System (OS) of the device 100. With embodiments, the one or more device images 130 may include images for different versions of the firmware and/or the operating system.

The device 100 may be coupled to an IoT platform 140, which includes an IoT service 150. The IoT service 150 may also store device images 160 for multiple devices, where the device images 160 include the one or more device images 130 for use in reloading a device image to device 100. Additionally, the IoT service 150 may store device states 162 for multiple devices, where the device states 162 include a device state 132 for the device 100 for use in restoring the state of the device 100. The IoT platform may be part of a cloud environment or may be connected to the device 100 in any manner (e.g., via any network).

For a device, a customer may provide a schema describing the state of that device ("device state"), which is ingested by the IoT platform. Since the customer defines the schema, it is configurable so that a multitude of applications may use that schema. Thus, the device state may be different for different devices, for different groups of devices, for different types of devices, etc. Thus, restoring the device state may be different for different types of devices.

For example, say a first company makes a light switch, a second company makes a light switch, and both companies use the IoT platform. Then, a customer has both of these light switches installed in a building that is part of an IoT solution.

Using the device state schema, each light switch may have a slightly different schema, which defines whether or not the light itself is on or off. Then, for example, mapping may be used to map the first company's schema field "power" and the second company's schema field "state", both of which physically correspond to whether the light is on or off, to a normalized meaning of light_power_state. Thus, for different types of light switches, embodiments know whether or not they are "on" or "off" and may do various calculations/manipulations using that normalized data, no matter which specific physical light switch is installed in the building at various locations. As an example, restoring the light switch may mean turning it "on", but this depends on how the schema defines restoration.

An IoT platform may be used as a framework to build a particular IoT solution from end to end using tools, services, Application Programming Interfaces (APIs), and protocols prescribed and/or provided by the IoT platform. An IoT service is part of the IoT platform, with the IoT service being the endpoint that devices (e.g., IoT devices) or gateways connect to for sending and receiving data (e.g., for analytics, information management, risk and security management, etc.). Thus, the IoT platform may be described as an IoT service provider.

The security system 110 improves security for devices (e.g., IoT devices) by continuously flushing and reloading one or more device images to an uninfected version (e.g., an original state of the device image). With embodiments, a device image may be for firmware, for the operating system of the device or for both the firmware and the operating system of the device. With embodiments, the security system 110 may periodically flush and reload the one or more device images. With other embodiments, the security system 110 may flush and reload the one or more device images when a vulnerability is discovered through threat analysis.

Furthermore, the security system 110 maintains data integrity through use and integration with an IoT platform that provides an IoT service.

With embodiments, reloading the device image refers to reinstallation of a full device software stack (firmware, operating system, etc.) to mitigate a security risk or infection that may have already occurred. With embodiments, the security system 110 provides a complete overwrite and reinstallation of software on the entire device to a version that is not infected at periodic intervals or immediately at the point of infection. A version that is not infected may be referred to as "uninfected", "clean" or "good".

Furthermore, the security system 110, through synchronization and analysis of periodic snapshots, triggers the reinstallation of the full device software immediately at the moment of infection to mitigate a security risk more quickly. The analysis may be cognitive analysis for eradicating an infection of the device quickly after the time of infection, thus more effectively addressing the security risk, by not waiting for a pre-determined amount of time to pass before a corrective action is taken.

Figure 2:
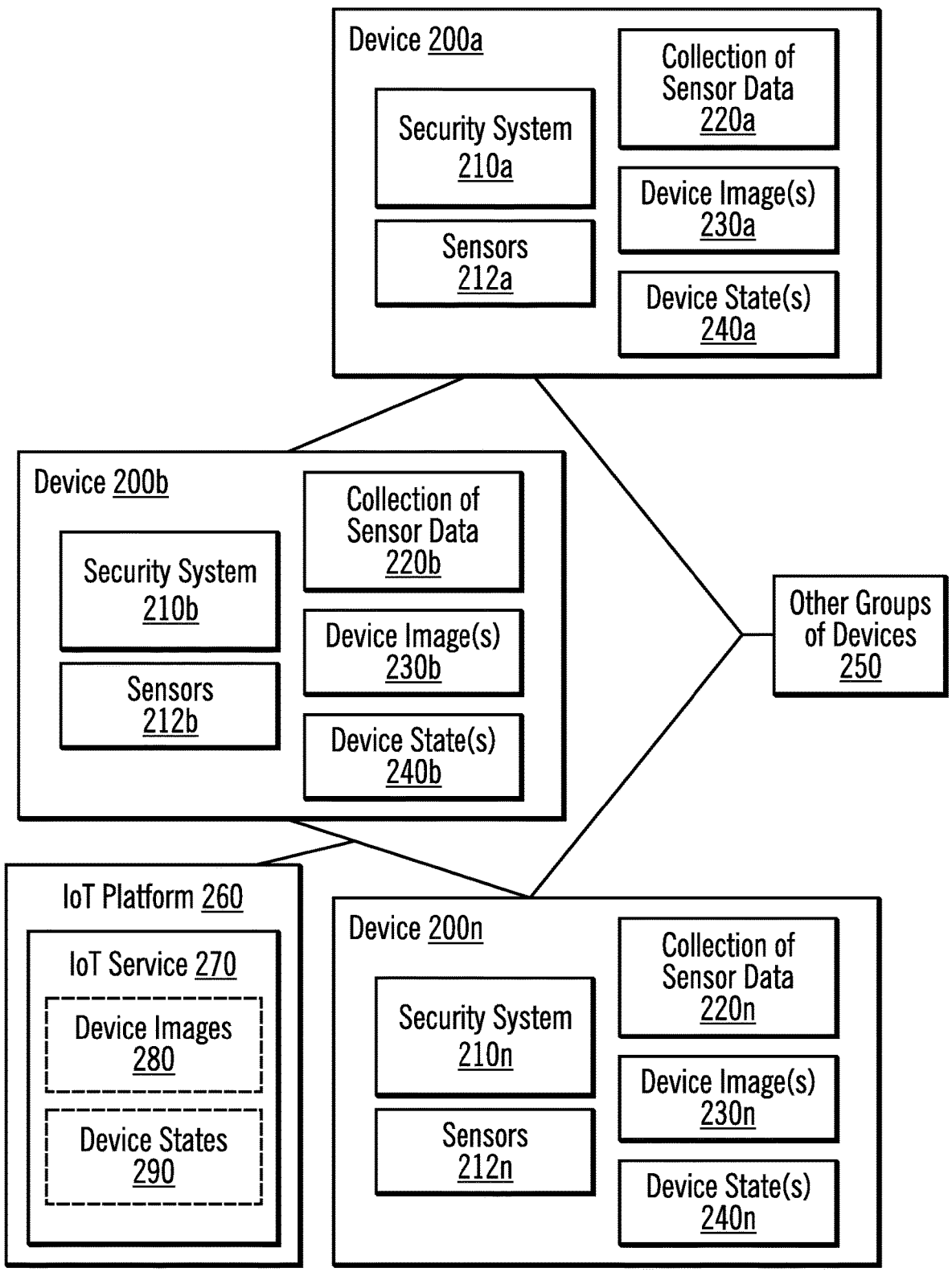
FIG. 2 illustrates a group of devices in accordance with certain embodiments.

FIG. 2 illustrates a group of devices in accordance with certain embodiments. The group of devices may form an IoT group. The devices may be IoT devices. The group of devices includes devices 200a, 200b . . . 200n. Each device 200a, 200b . . . 200n in the group of devices is coupled to each of the other devices 200a, 200b . . . 200n via a network, such as the Internet, an intranet, etc. Moreover, the group of devices 200a, 200b . . . 200n may be coupled to other groups of devices 250. Each of the devices 200a, 200b . . . 200n includes a security system, sensors, a collection of sensor data, a one or more device images, and one or more device states. For example, device 200a includes a security system 210a, sensors 212a, a collection of sensor data 220a, one or more device images 230a, and one or more device states 240a; device 200b includes a security system 210b, sensors 212b, a collection of sensor data 220b, one or more device images 230b, and one or more device states 240b; and device 200n includes a security system 210n, sensors 212n, a collection of sensor data 220n, one or more device images 230n, and one or more device states 240n. With embodiments, the group of devices 200a, 200b . . . 200n is coupled to an IoT platform 260, which includes an IoT service 270. The IoT service 270 stores device images 280 (for the devices 200a, 200b . . . 200n) and device states 290 (for the devices 200a, 200b . . . 200n).

The security system 110 mitigates security threats on a device by continuous device image reload. With embodiments, the security system 110 reloads one or more device images after the expiration of a time period. Thus, with embodiments, the security system 110 reloads a device firmware after the expiration of a time period and/or reloads a device operating system after the expiration of a time period.

With embodiments, the security system 110 reloads a device image from an on-device-stored device image (i.e., a device image stored on the device itself) or using a device image pulled from an IoT service.

With embodiments, the security system 110 saves an individual device's IoT credentials before the device image reload. The, with embodiments, the security system 110 reloads an individual device's IoT credentials after the device image reload. With embodiments, the IoT credentials may be stored on the device or stored with the IoT service.

With embodiments, the security system 110 saves a snapshot of a possibly infected image for further onboard analysis before the device image reload occurs. With embodiments, the security system 110 analyzes the snapshot using onboard analysis to detect an unknown infection using comparison with known uninfected ("clean" or "good") signatures. With embodiments, the security system 110 analyzes the snapshot using an IoT service to perform analysis to detect an unknown infection.

With embodiments, the security system 110 identifies a previously unknown infection in a snapshot image and notifies an IoT service for additional countermeasures for other devices. With embodiments, the snapshot may be stored on the device or stored with the IoT service.

With embodiments, the security system 110 maintains data integrity during the process of continuous device image reload. With embodiments, the security system 110 saves device data onto an IoT service prior to a device image reload. With embodiments, the security system 110 restores the device data from the IoT service to the device after a device image reload.

With embodiments, there are additional triggers for security mitigation using device image reload. With embodiments, a warning that is received from an IoT service of a known infection is an additional trigger that causes device image reload. With embodiments, failure of an internal onboard security check is an additional trigger that causes device image reload.

With embodiments, the security system 110 discovers, when reloading the device image, that the device may have been compromised and marks any data given for that time period as suspicious.

Figure 3:
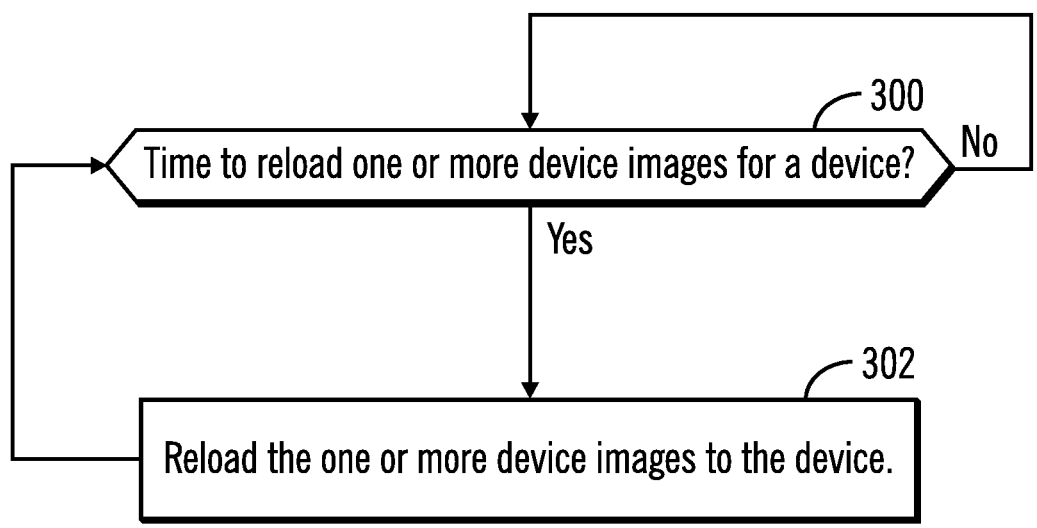
FIG. 3 illustrates, in a flow chart, operations for image reload in accordance with certain embodiments.

FIG. 3 illustrates, in a flow chart, operations for image reload in accordance with certain embodiments. Control begins at block 300 with the security system 110 determining whether it is time to reload one or more device images for a device (e.g., an IoT device). If so, processing continues to block 302, otherwise, processing loops back to block 300 to check again. The security system 110 determines whether it is time to reload the one or more device images based on triggers, such as whether a period of time has expired, whether notification of a known infection has been received or whether there has been failure of an internal onboard security check.

In block 302, the security system 110 reloads the one or more device images to the device (e.g., for the firmware and/or the operating system).

Figure 4:
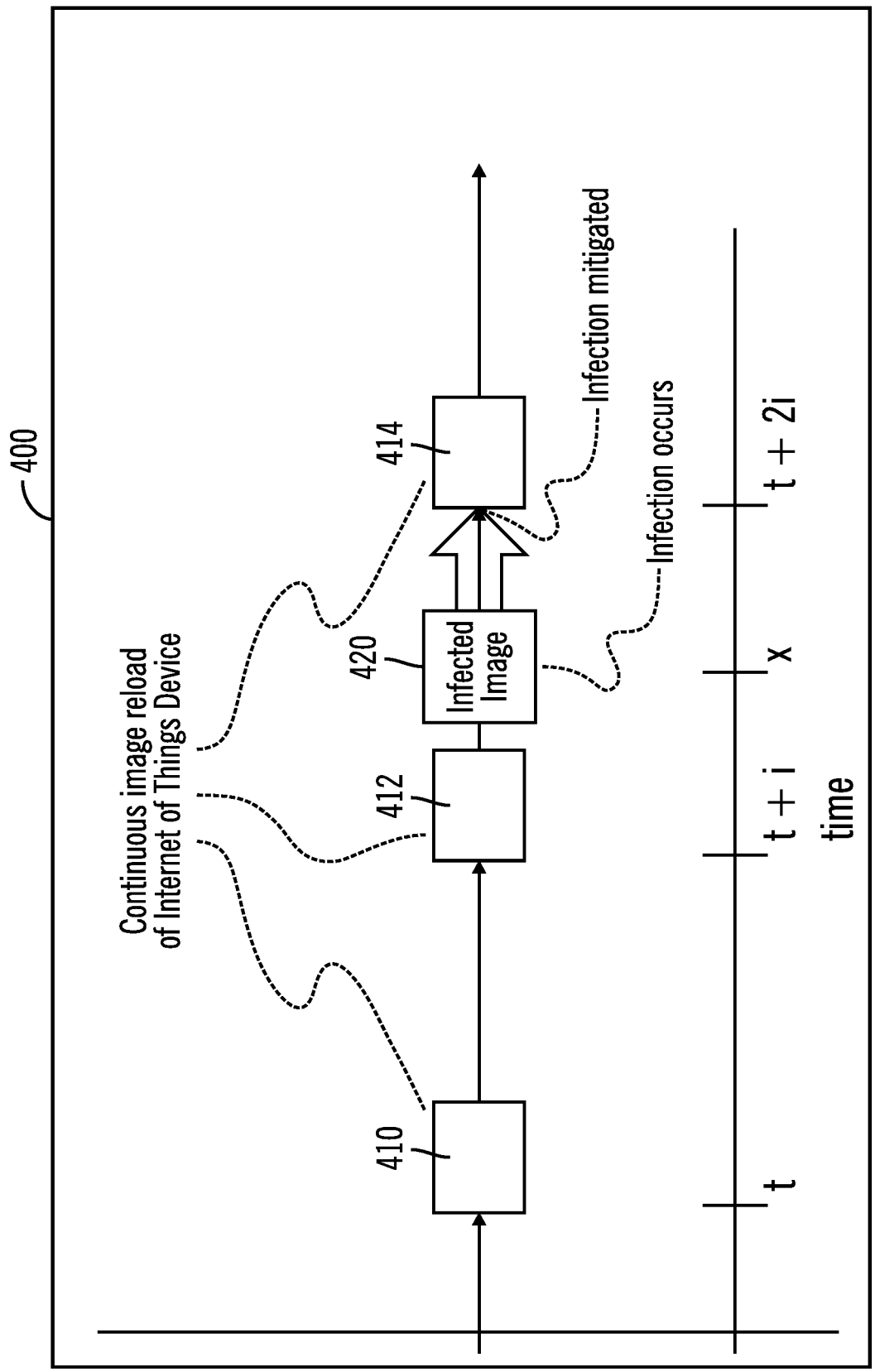
FIG. 4 illustrates a time line of image reload to remove an infected image in accordance with certain embodiments.

FIG. 4 illustrates a time line 400 of image reload to remove an infected image in accordance with certain embodiments. In FIG. 4, device images 410, 412, and 414 represent uninfected ("clean" or "good") device images, while device image 420 represents an infected device image. At time t, an uninfected device image 410 is reloaded on to the device. At time t+1, an uninfected device image 412 is reloaded on to the device. At time x, the device image 420 is infected. At time, t+2i, an uninfected device image 414 is reloaded on to the device, which flushes out the infected device image 420 and mitigates the infection.

Figure 5:
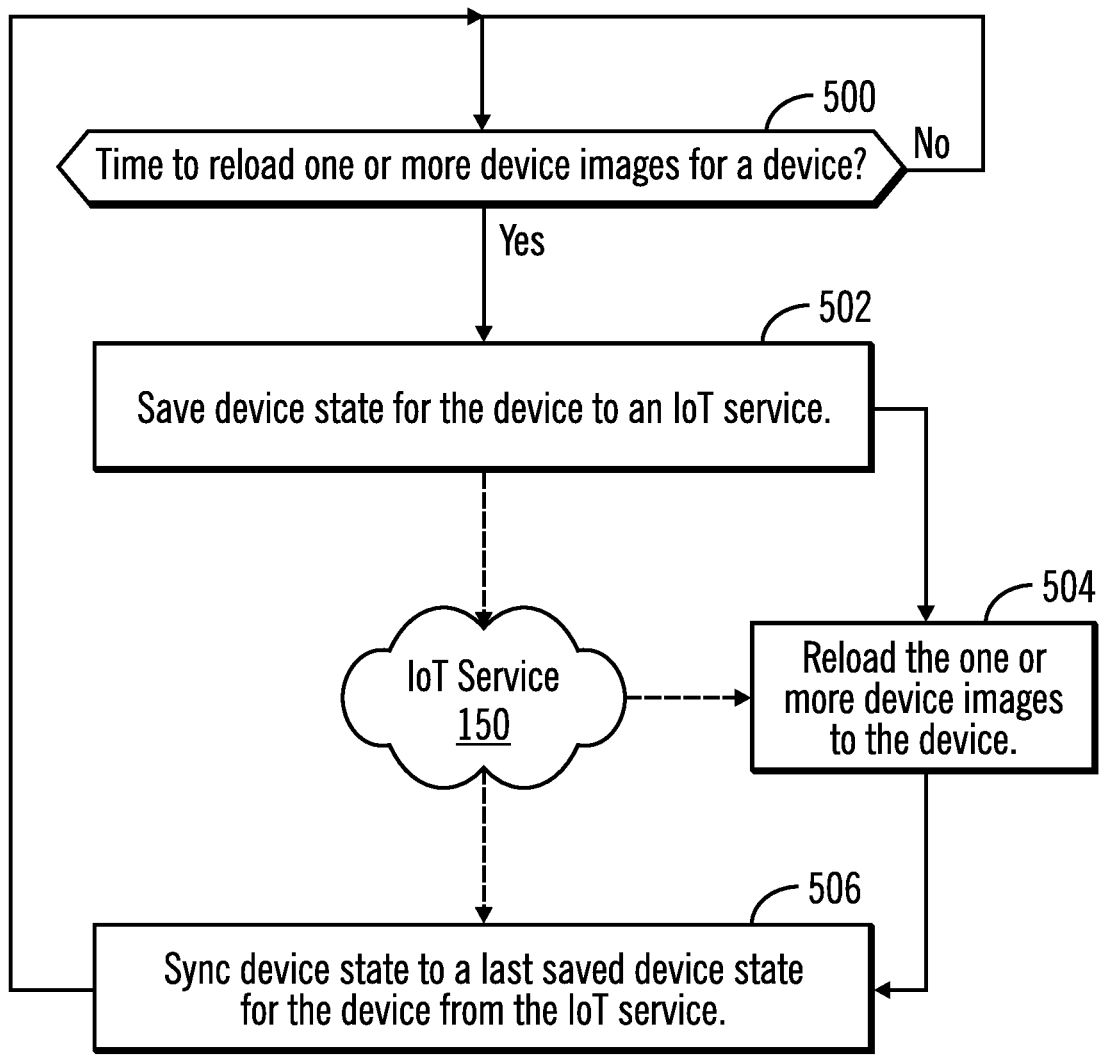
FIG. 5 illustrates, in a flow chart, operations for image reload with integration to an IoT service to maintain data integrity in accordance with certain embodiments.

FIG. 5 illustrates, in a flow chart, operations for image reload with integration to an IoT service to maintain data integrity in accordance with certain embodiments. Control begins at block 500 with the security system 110 determining whether it is time to reload one or more device images for a device (e.g., an IoT device). If so, processing continues to block 502, otherwise, processing loops back to block 500 to check again. The security system 110 determines whether it is time to reload the one or more device images based on triggers, such as whether a period of time has expired, whether notification of a known infection has been received or whether there has been failure of an internal onboard security check.

In block 502, the security system 110 saves a device state for the device to an IoT service 150. With embodiments, the IoT service is part of an IoT platform. With embodiments, the IoT service stores the device state that may be later retrieved by a device.

In block 504, the security system 110 reloads the one or more device images to the device (e.g., for the firmware and/or the operating system). With embodiments, the security system 110 reloads any of the one or more device images from an on-device-stored device image. In other embodiments, the security system 110 reloads any of the device images using a device image pulled from the IoT service 150.

In block 506, the security system 110 syncs the device state to a last saved device state for the device from the IoT service 150. With embodiments, if multiple device states are saved at the IoT service 150 for the device, one of the multiple devices states may be selected by the security system 110 based on various factors or by a user of the device. Thus, the device state may be saved and retrieved with the IoT service 150.

Figure 6:
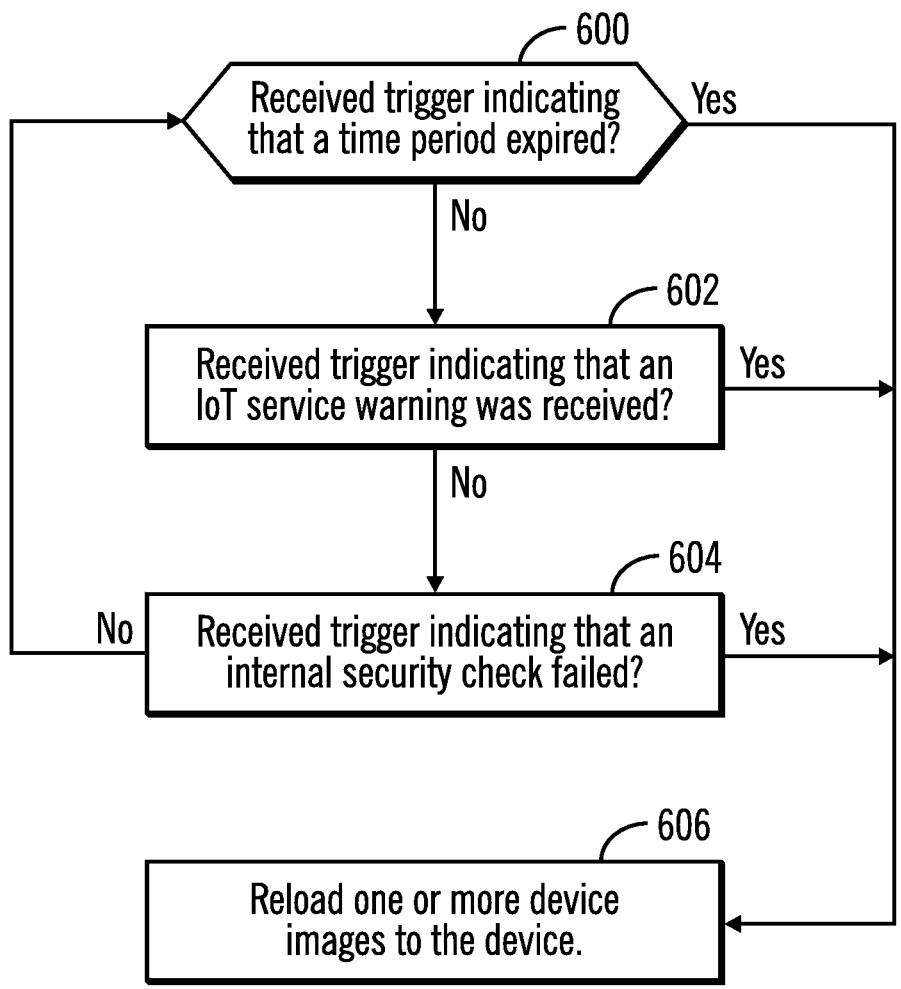
FIG. 6 illustrates in a flow chart, operations for triggering image reload in accordance with certain embodiments.

FIG. 6 illustrates in a flow chart, operations for triggering image reload in accordance with certain embodiments. Control begins at block 600 with the security system 110 determining whether a trigger indicating that a period of time has expired was received. If so, processing continues to block 606, otherwise, processing continues to block 602.

In block 602, the security system 110 determines whether a trigger indicating that an IoT service warning was received. If so, processing continues to block 606, otherwise, processing continues to block 604. The IoT service warning may a known infection.

In block 604, the security system 110 determines whether a trigger indicating that an internal security check failed was received. If so, processing continues to block 606, otherwise, processing continues to block 600. The internal security check failure may be for failure of an internal onboard security check. In block 606, the security system 110 reloads the one or more device images to the device (e.g., for the firmware and/or the operating system).

Figure 7:
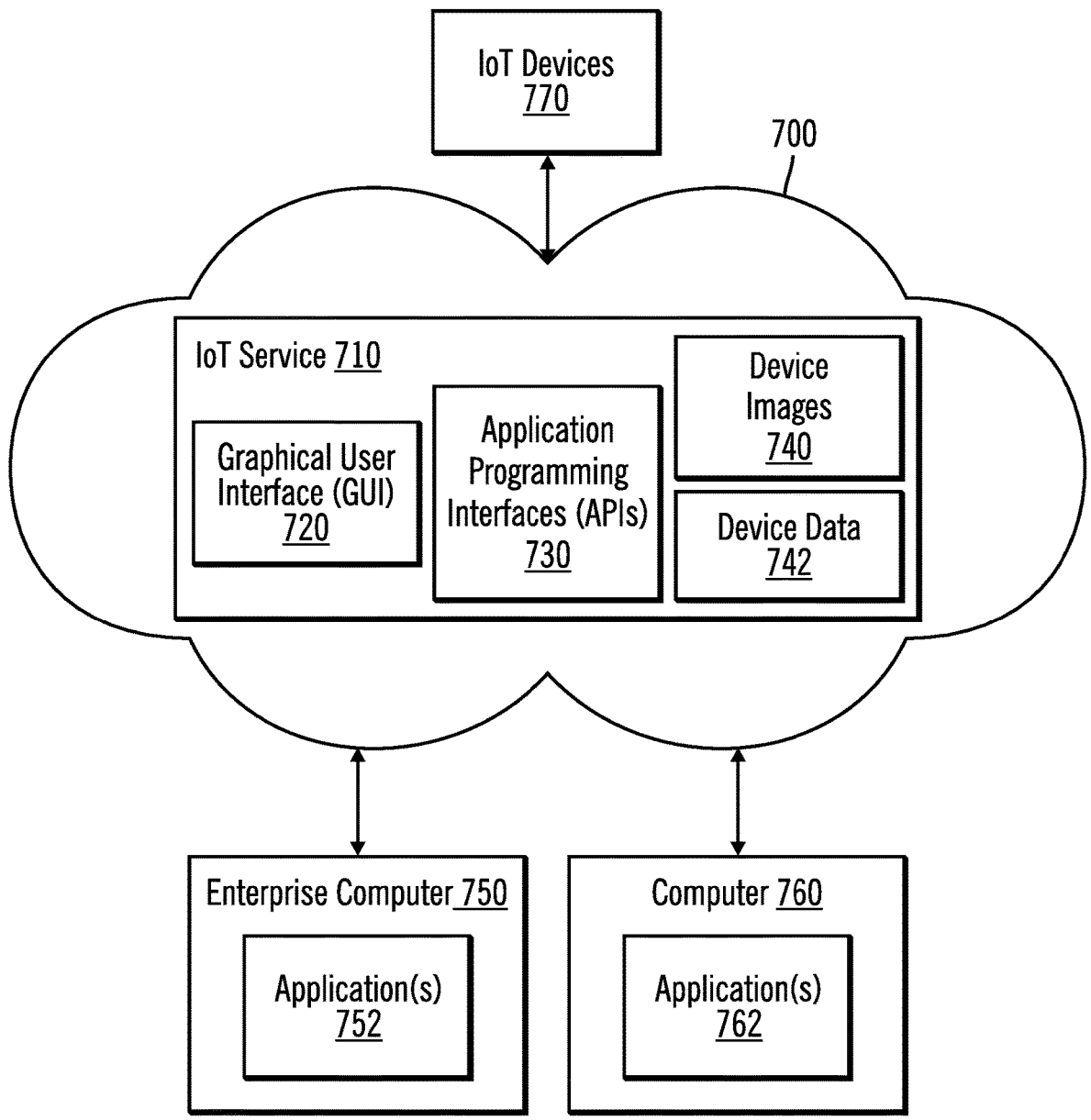
FIG. 7 illustrates, in a block diagram, a computing environment with IoT devices, a cloud environment, and computers in accordance with certain embodiments.

FIG. 7 illustrates, in a block diagram, a computing environment with IoT devices, a cloud environment, and computers in accordance with certain embodiments. In FIG. 7, an IoT service 710 resides in a cloud environment 700. The IoT service 710 includes a Graphical User Interface (GUI) 720, Application Programming Interfaces (APIs) 730, device images 740, and device data 742 (e.g., live device data, historical device data, etc., which may include device state). IoT devices 770 are coupled to the IoT service 710. Each of the IoT devices 770 may have the components of device 100 (FIG. 1). Also, computers, such as enterprise computer 750 and computer 760 are coupled to the IoT service 710. The enterprise computer 750 executes one or more applications 752. The computer 760, which may be any type of computer (e.g., a client computer, a server computer, personal computer, etc.) executes one or more applications 762.

The GUI 720 and the APIs 730 enable management of the IoT devices 770 by enabling registration of a new device, update of firmware and/or an OS of a device, reboot of a device, etc. The GUI 720 may be browser-based. The APIs may be Representational State Transfer (REST) APIs. The one or more applications 752, 762 may perform analytics on live device data, inspect historical device data through the REST APIs, and/or send commands to devices. With embodiments, analytics on device data may include, but are not limited to, performing statistical calculations (e.g., average and standard deviation), displaying visualizations of device behavior, training machine-learning models, and comparing observed behavior to predicted behavior that is calculated using a learned model. With embodiments, common IoT devices 770 and applications 752, 762 may be grouped into "organizations", so that the IoT devices 770 and applications 752, 762 in an organization may more easily work together. With embodiments, each of the IoT devices 770 executes a security system, which is a device management agent that understands the protocol for communication with the IoT service 710.

Figure 8:
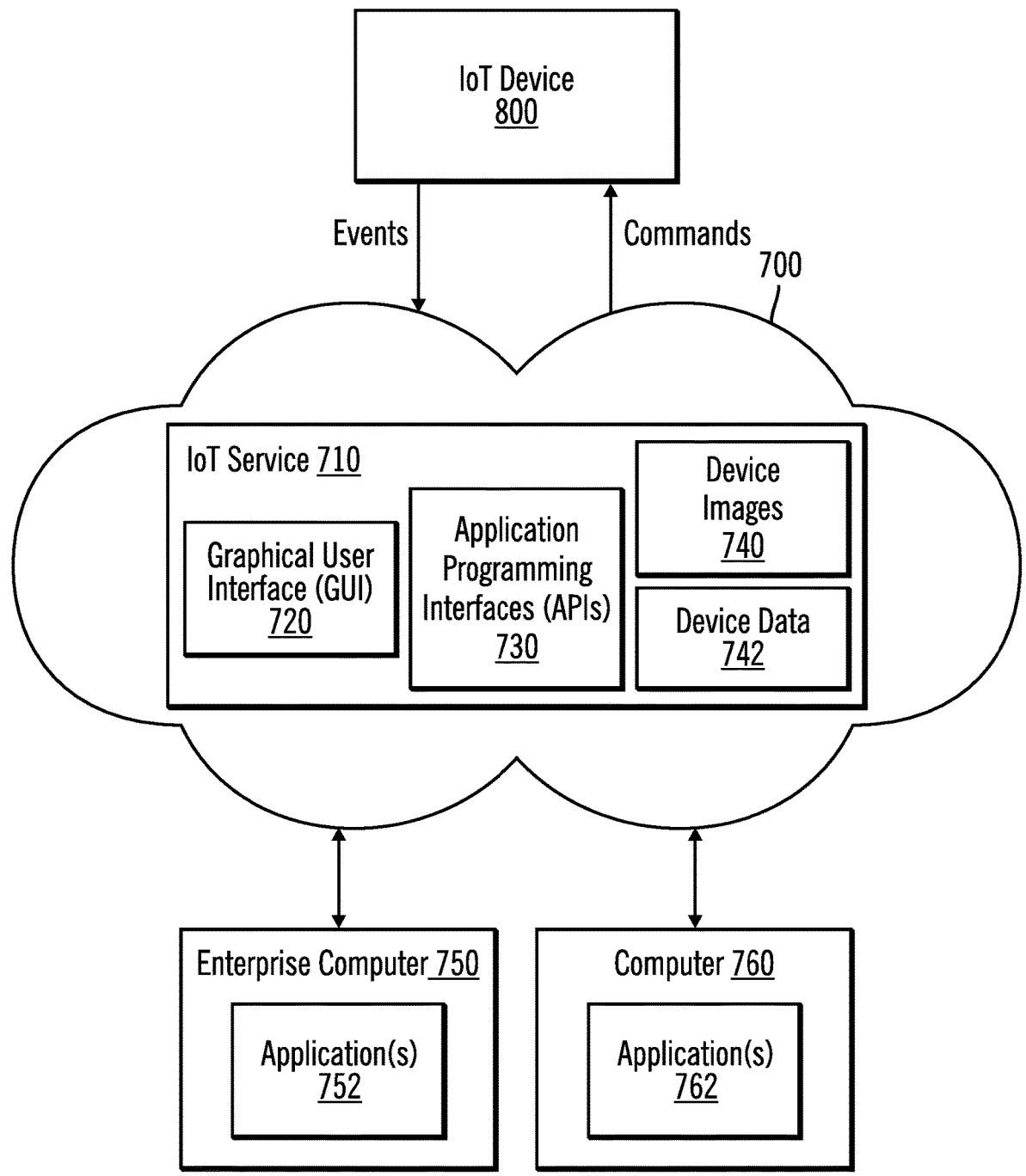
FIG. 8 illustrates, in a block diagram, another computing environment with an IoT device, a cloud environment, and computers in accordance with certain embodiments.

FIG. 8 illustrates, in a block diagram, another computing environment with an IoT device, a cloud environment, and computers in accordance with certain embodiments. In FIG. 8 an IoT device 100 sends events to the IoT service 710, and the IoT service sends commands to the IoT device 800. With embodiments, events include: temperature, humidity, barometric pressure, Global Positioning System (GPS) data, state, speed, fan speed, etc. With embodiments, the commands include reload device image, reboot, perform device diagnostics, retrieve error codes/logs, etc.

With embodiments, the applications 752, 762 are integrated via any protocol. In certain embodiments, the applications 752, 762 are integrated via a Message Queue Telemetry Transport (MQTT) connection to a device data stream. With embodiments, the applications 752, 762 may be enterprise applications. With embodiments, the applications 752, 762 may store data in the cloud environment 700 or choose other storage (e.g., a local database).

While the IoT domain presents many challenges, there are also some characteristics that are particular to the IoT domain. One such characteristic is that often there may not be a human operator continuously monitoring an IoT device, so it is not as sensitive to short outages or delays in operation as a computer may be, where a human is actively using that computer, which therefore requires attention to human interface concerns. Because these human interface concerns may be largely ignored for an IoT device, embodiments take additional security operations that may cause a short outage, but yield a more secure IoT device life span in the long term. This is especially true for applications other than those that need continuous up-time.

In addition, with the growth of Software as a Service (SaaS) offerings providing IoT platform features, embodiments exploit new capabilities. The data integrity of an IoT device may be maintained while also continuously flushing out malware and security threats from the IoT device itself. Furthermore, information about previously unknown attack vectors may be collected by an IoT service and shared with similar IoT devices so that additional precautions against known vulnerabilities may be taken.

With embodiments, it is likely in the IoT space that a small break in data collection or short outage while an IoT device is reloading itself back to a clean version to maintain an optimal security posture is not a cause for concern or even noticed at all. Embodiments continuously reload an image or images (firmware and/or Operating System (OS)) for the purpose of increased security. Furthermore, embodiments maintain data integrity for an IoT device which has is integrated with an IoT platform that provides an IoT service.

Figure 9:
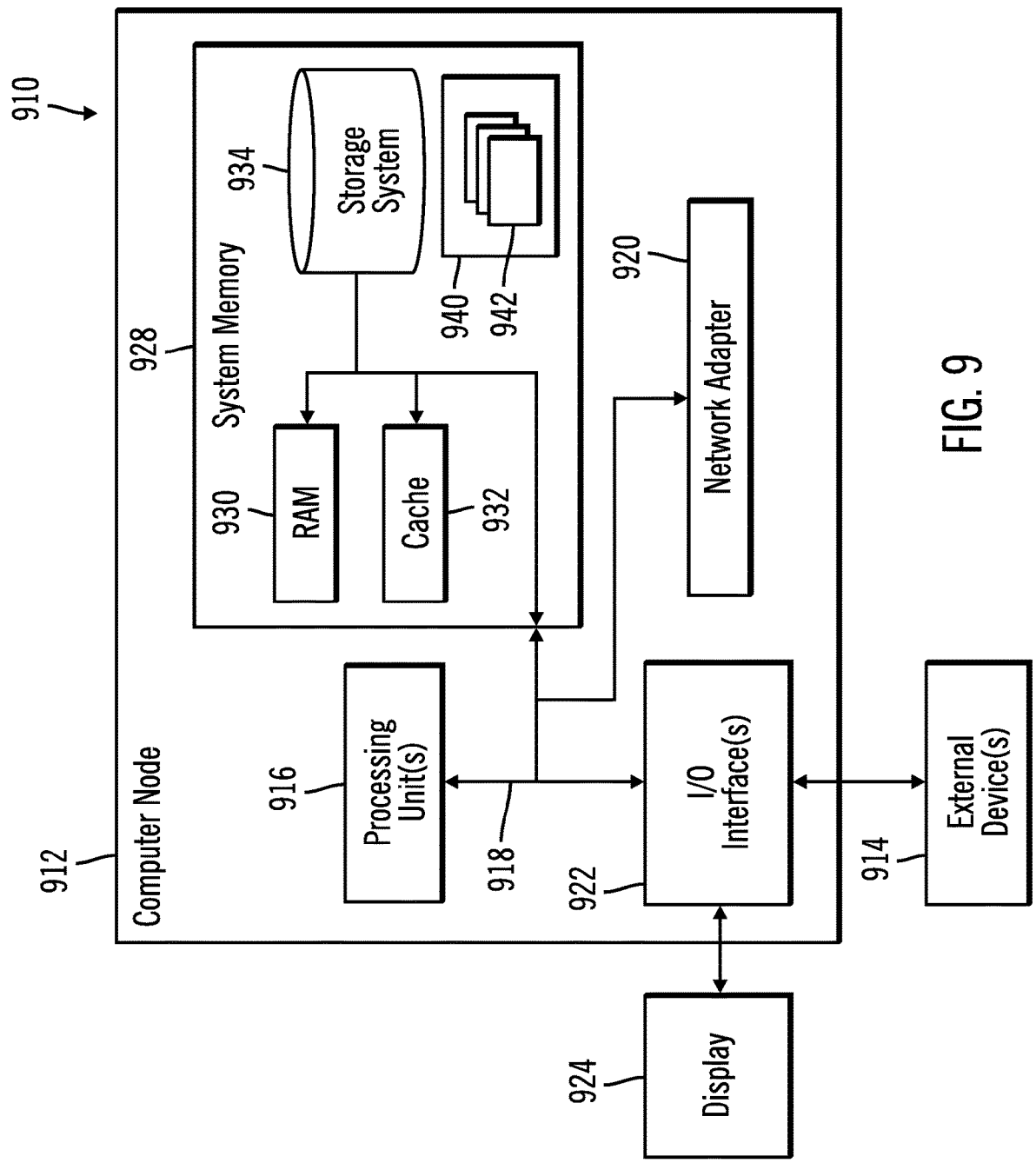
FIG. 9 illustrates a computing node in accordance with certain embodiments.

FIG. 9 illustrates a computing environment 910 in accordance with certain embodiments. In certain embodiments, the computing environment is a cloud computing environment. Referring to FIG. 9, computer node 912 is only one example of a suitable computing node and is not intended to suggest any limitation as to the scope of use or functionality of embodiments of the invention described herein. Regardless, computer node 912 is capable of being implemented and/or performing any of the functionality set forth hereinabove.

The computer node 912 may be a computer system, which is operational with numerous other general purpose or special purpose computing system environments or configurations. Examples of well-known computing systems, environments, and/or configurations that may be suitable for use with computer node 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 912 may be described in the general context of computer system executable instructions, such as program modules, being executed by a computer system. Generally, program modules may include routines, programs, objects, components, logic, data structures, and so on that perform particular tasks or implement particular abstract data types. Computer node 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 912 in cloud computing node 910 is shown in the form of a general-purpose computing device. The components of computer node 912 may include, but are not limited to, one or more processors or processing units 916, a system memory 928, and a bus 918 that couples various system components including system memory 928 to one or more processors or processing units 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 912 typically includes a variety of computer system readable media. Such media may be any available media that is accessible by computer node 912, and it includes both volatile and non-volatile media, removable and non-removable media.

System memory 928 can include computer system readable media in the form of volatile memory, such as random access memory (RAM) 930 and/or cache memory 932. Computer node 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, system memory 928 may include at least one program product having a set (e.g., at least one) of program modules that are configured to carry out the functions of embodiments of the invention.

Program/utility 940, having a set (at least one) of program modules 942, may be stored in system memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer node 912 may also communicate with one or more external devices 914 such as a keyboard, a pointing device, a display 924, etc.; one or more devices that enable a user to interact with computer node 912; and/or any devices (e.g., network card, modem, etc.) that enable computer node 912 to communicate with one or more other computing devices. Such communication can occur via Input/Output (I/O) interfaces 922. Still yet, computer node 912 can communicate with one or more networks such as a local area network (LAN), a general wide area network (WAN), and/or a public network (e.g., the Internet) via network adapter 920. As depicted, network adapter 920 communicates with the other components of computer node 912 via bus 918. It should be understood that although not shown, other hardware and/or software components could be used in conjunction with computer node 912. Examples, include, but are not limited to: microcode, device drivers, redundant processing units, external disk drive arrays, RAID systems, tape drives, and data archival storage systems, etc.

In certain embodiments, the device 100 has the architecture of computer node 912. In certain embodiments, the device 100 is part of a cloud infrastructure. In certain alternative embodiments, the device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
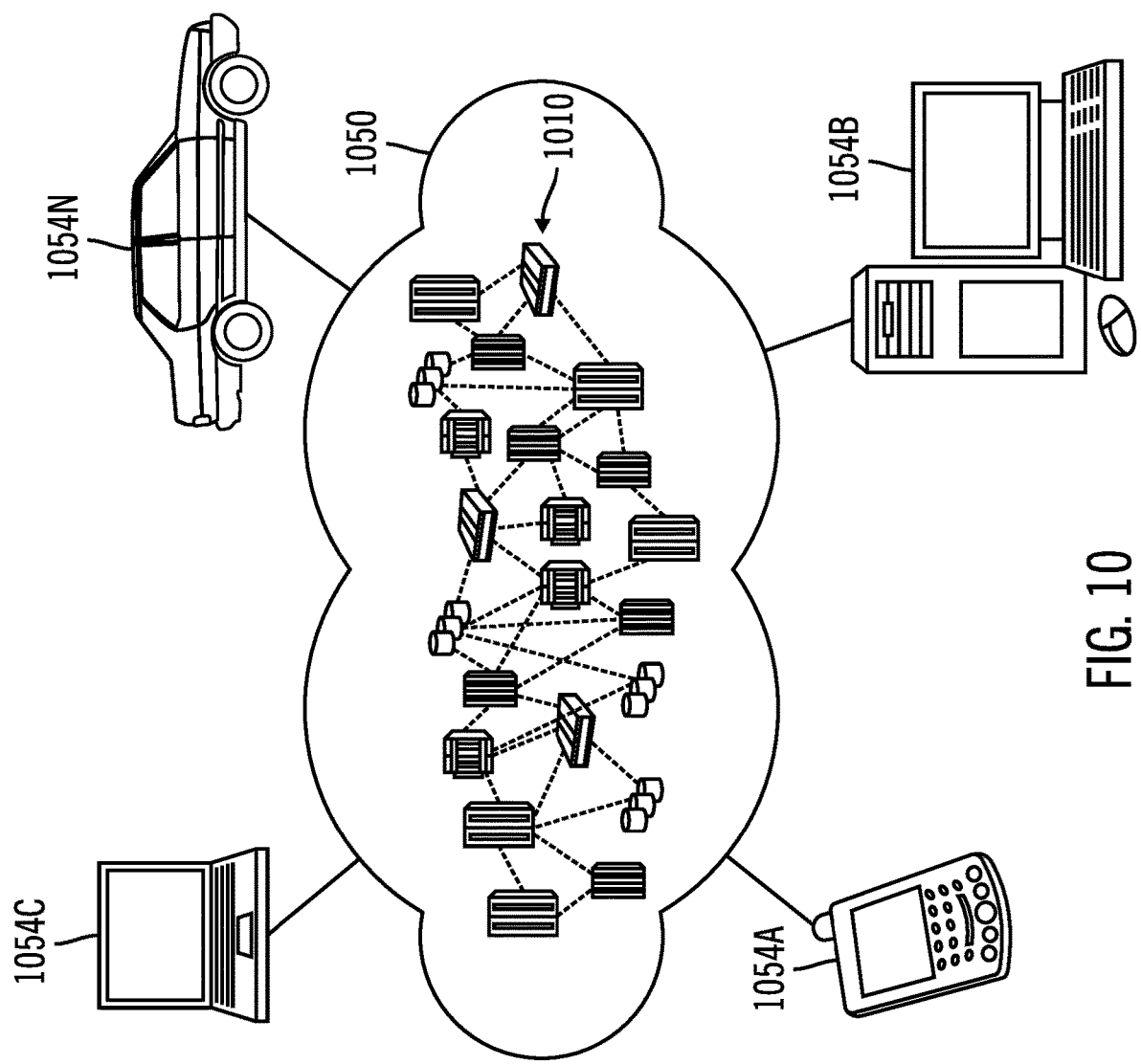
FIG. 10 depicts a cloud computing environment according to an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
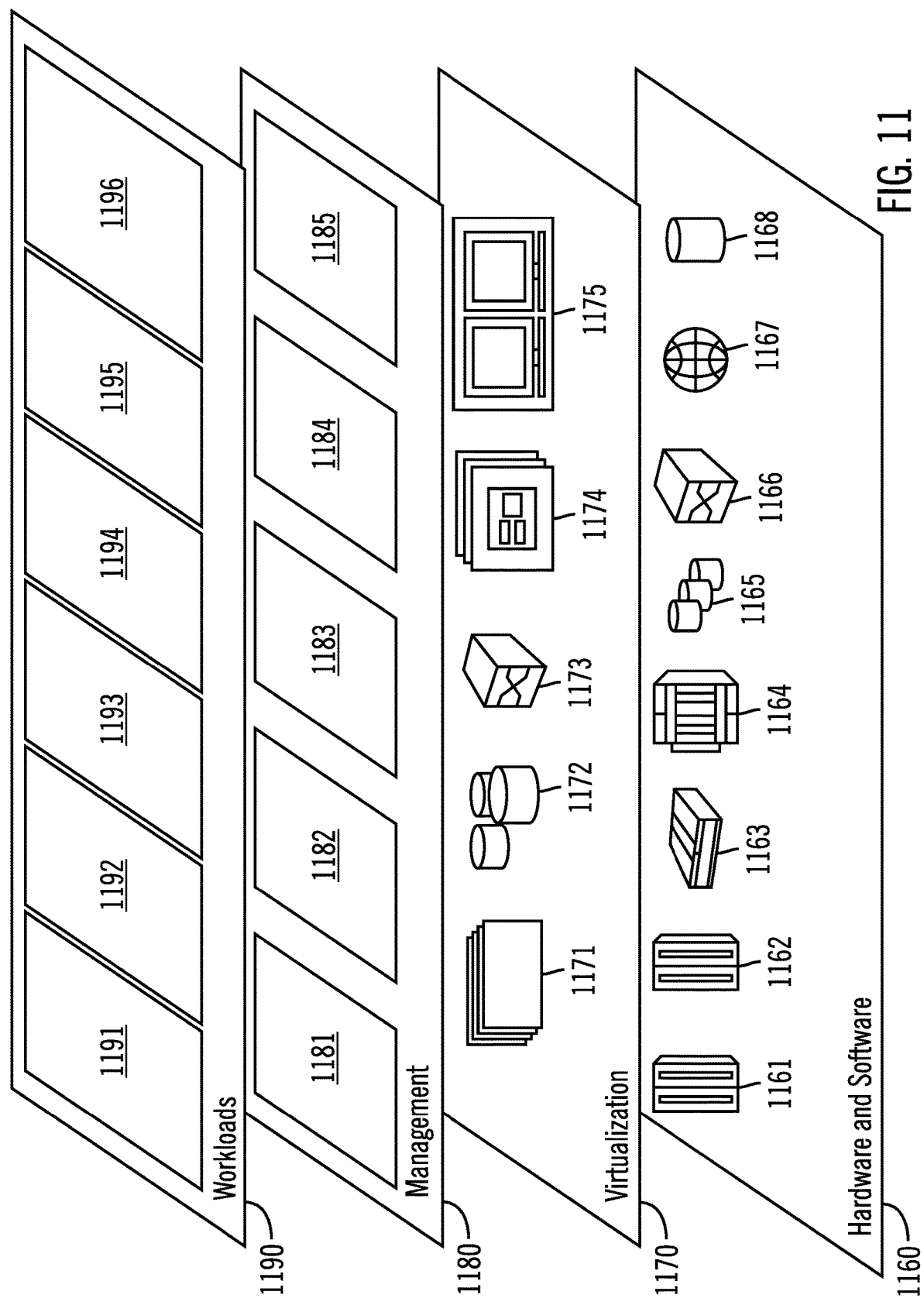
FIG. 11 depicts abstraction model layers according to an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and mitigating security risks utilizing continuous device image reload with data integrity 1196.

Thus, in certain embodiments, software or a program, implementing g mitigating security risks utilizing continuous device image reload with data integrity in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for maintaining data integrity, comprising operations for:
    performing continuous reload of a first image on a device in an Internet of Things (IoT) group of devices coupled to an IoT service based on triggers by:
        receiving a trigger from the triggers that indicates one of that a period of time has expired, that notification of a known infection has been received, and that there has been failure of an internal onboard security check;
        saving a device state for the device to the IoT service, wherein the device state comprises a schema;
        saving a snapshot of the first image to a data store of the IoT service;
        obtaining a second image that is not infected from the IoT service;
        reloading the device with the second image to replace the first image with the second image;
        syncing a current device state for the device to the saved device state for the device from the IoT service;
        analyzing the snapshot of the first image to detect a previously unknown infection; and
        sending a notification to the IoT service for one or more countermeasures for other devices of the IoT group of devices.

2. The computer-implemented method of claim 1, wherein the first image is for at least one of firmware and an operating system.

3. The computer-implemented method of claim 1, further comprising operations for:
    saving credentials before replacing the first image with the second image; and
    reloading the credentials after replacing the first image with a second image.

4. The computer-implemented method of claim 1, further comprising operations for:
    saving device data before replacing the first image with the second image, wherein the device data comprises live device data and historical device data; and
    reloading the device data after replacing the first image with the second image.

5. The computer-implemented method of claim 1, further comprising operations for:
    performing analytics of device data of the device.

6. The computer-implemented method of claim 1, wherein a Software as a Service (SaaS) is configured to perform operations of the method.

7. A computer program product, the computer program product comprising a computer readable storage medium having program code embodied therewith, the program code executable by at least one processor to perform operations for:

performing continuous reload of a first image on a device in an Internet of Things (IoT) group of devices coupled to an IoT service based on triggers by:
  receiving a trigger from the triggers that indicates one of that a period of time has expired, that notification of a known infection has been received, and that there has been failure of an internal onboard security check;
  saving a device state for the device to the IoT service, wherein the device state comprises a schema;
  saving a snapshot of the first image to a data store of the IoT service;
  obtaining a second image that is not infected from the IoT service;
  reloading the device with the second image to replace the first image with the second image;
  syncing a current device state for the device to the saved device state for the device from the IoT service;
  analyzing the snapshot of the first image to detect a previously unknown infection; and
  sending a notification to the IoT service for one or more countermeasures for other devices of the IoT group of devices.

8. The computer program product of claim 7, wherein the first image is for at least one of firmware and an operating system.

9. The computer program product of claim 7, wherein the program code is executable by at least one processor to perform further operations for:
  saving credentials before replacing the first image with the second image; and
  reloading the credentials after replacing the first image with a second image.

10. The computer program product of claim 7, wherein the program code is executable by at least one processor to perform further operations for:
  saving device data before replacing the first image with the second image, wherein the device data comprises live device data and historical device data; and
  reloading the device data after replacing the first image with the second image.

11. The computer program product of claim 7, wherein the program code is executable by at least one processor to perform further operations for:
  performing analytics of device data of the device.

12. The computer program product of claim 7, wherein a Software as a Service (SaaS) is configured to perform the operations of the computer program product.

13. A computer system, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more memories, to perform operations comprising:
  performing continuous reload of a first image on a device in an Internet of Things (IoT) group of devices coupled to an IoT service based on triggers by:
    receiving a trigger from the triggers that indicates one of that a period of time has expired, that notification of a known infection has been received, and that there has been failure of an internal onboard security check;
    saving a device state for the device to the IoT service, wherein the device state comprises a schema;
    saving a snapshot of the first image to a data store of the IoT service;
    obtaining a second image that is not infected from the IoT service;
    reloading the device with the second image to replace the first image with the second image;
    syncing a current device state for the device to the saved device state for the device from the IoT service;
    analyzing the snapshot of the first image to detect a previously unknown infection; and
    sending a notification to the IoT service for one or more countermeasures for other devices of the IoT group of devices.

14. The computer system of claim 13, wherein the first image is for at least one of firmware and an operating system.

15. The computer system of claim 13, wherein the operations further comprise:
  saving credentials before replacing the first image with the second image; and
  reloading the credentials after replacing the first image with a second image.

16. The computer system of claim 13, wherein the operations further comprise:
  saving device data before replacing the first image with the second image, wherein the device data comprises live device data and historical device data; and
  reloading the device data after replacing the first image with the second image.

17. The computer system of claim 13, wherein a Software as a Service (SaaS) is configured to perform the operations of the computer system.

18. The computer system of claim 13, wherein the operations further comprise:
  performing analytics of device data of the device.

* * * * *